(12) United States Patent
Jeng et al.

(10) Patent No.: US 9,145,958 B2
(45) Date of Patent: Sep. 29, 2015

(54) BALL SCREW CAPABLE OF REAL-TIME SURVEILLANCE AND CONTROL OF PRELOAD

(71) Applicant: NATIONAL CHUNG CHENG UNIVERSITY, Chia-Yi (TW)

(72) Inventors: Yeau-Ren Jeng, Tainan (TW); Yu-Xian Huang, Tainan (TW)

(73) Assignee: NATIONAL CHUNG CHENG UNIVERSITY, Chia-Yi County (TW)

( * ) Notice: Subject to any disclaimer, the term of this patent is extended or adjusted under 35 U.S.C. 154(b) by 379 days.

(21) Appl. No.: 13/750,183

(22) Filed: Jan. 25, 2013

(65) Prior Publication Data

US 2014/0165759 A1    Jun. 19, 2014

(30) Foreign Application Priority Data

Dec. 14, 2012    (TW) .............................. 101147507 A

(51) Int. Cl.
*F16H 25/22*    (2006.01)
*F16H 25/20*    (2006.01)
*F16H 57/01*    (2012.01)

(52) U.S. Cl.
CPC ........ *F16H 25/2006* (2013.01); *F16H 25/2214* (2013.01); *F16H 57/01* (2013.01); *F16H 2057/016* (2013.01); *Y10T 74/19744* (2015.01)

(58) Field of Classification Search
CPC .......... F16H 25/2204; F16H 2057/016; F16H 25/2006; F16H 25/2214; F16H 57/01
See application file for complete search history.

(56) References Cited

U.S. PATENT DOCUMENTS

| | | | | |
|---|---|---|---|---|
| 5,367,915 A * | 11/1994 | Nishii | .............................. | 74/441 |
| 5,510,937 A * | 4/1996 | Mogamiya | .................... | 359/823 |
| 5,644,951 A * | 7/1997 | Hatamura | ..................... | 74/89.42 |
| 5,697,252 A * | 12/1997 | Yamaguchi et al. | ............ | 74/441 |
| 7,458,292 B2 * | 12/2008 | Scholz | ........................ | 74/424.72 |
| 7,474,176 B2 * | 1/2009 | Henningsson et al. | ........ | 333/231 |
| 2003/0094056 A1 * | 5/2003 | Park | .............................. | 74/89.42 |
| 2004/0250637 A1 * | 12/2004 | Hosokai et al. | .............. | 74/89.42 |

FOREIGN PATENT DOCUMENTS

| | | |
|---|---|---|
| TW | M319129 | 9/2007 |
| TW | 201204960 | 2/2012 |

* cited by examiner

*Primary Examiner* — David M Fenstermacher
(74) *Attorney, Agent, or Firm* — Muncy, Geissler, Olds & Lowe, P.C.

(57) ABSTRACT

A ball screw includes a screw rod having an external thread; two screw nuts having an internal thread and a circulatory passage each, a spiral path being formed between the internal threads and the external thread and communicating with the circulatory passage, each of the two screw nuts having a keyway located on respective toric surfaces of opposite ends of the two screw nuts, the two keyways facing each other; a link mounted inside the two keyways to traverse the two screw nuts; a force sensor mounted between and squeezed by opposite sides of the two screw nuts; and a plurality of balls located inside the spiral path or the circulatory passage and keeping rolling while moving.

4 Claims, 4 Drawing Sheets

BALL SCREW CAPABLE OF REAL-TIME SURVEILLANCE AND CONTROL OF PRELOAD

BACKGROUND OF THE INVENTION

1. Field of the Invention

The present invention relates generally to a ball screw and more particularly, to a ball screw capable of real-time surveillance and control of preload.

2. Description of the Related Art

A ball screw is a common component in precision positioning and keeps rolling to serve as the power transmission interface between the screw rod and the screw nut for much reduction of frictional resistance in the process of movement.

The conventional double-nut ball screw includes two screw nuts, a preload piece mounted between the two nuts, two keyways formed on respective tonic surfaces of the two nuts and axially facing each other, and a link having two ends located inside the two keyways, respectively. In this way, while the screw rod is running, the two screw nuts keep combined with each other with a preload keeping oppressed onto the preload piece to further avoid potential axial gap resulting from movement of the ball screw and to enhance the rigidity, positioning precision, and positioning stability of the ball screw in operation. For this reason, the preload has become one of essential indexes of measuring the rigidity, positioning precision, and positioning stability of the ball screw.

However, after the ball screw has been used for a period of time, wear and tear happens among the balls, the screw rod, and the screw nuts to result in axial gap leading to decrement of preload between the two screw nuts in such a way that the rigidity, positioning precision, and positioning stability of the ball screw will become worse.

Taiwan Patent Publication No. 319129 disclosed a piezoelectric type pre-stress adjustment and position fine tuning mechanism of a ball screw, in which two portioning rings are mounted between two screw nuts, a pre-compressed spring holder and a pre-compressed spring are mounted between the partitioning rings and the screw nuts, and a piezoelectric actuator is mounted between the partitioning rings; a piezoelectric actuator and a dynamometer are mounted inside the piezoelectric actuator. However, such mechanism of this patent is structurally very complicated and it is not easy to assembly the mechanism. Besides, the variation of the preload between the two screw nuts cannot be directly measured but needs to be measured through the partitioning rings or other components, so the measurement result is not accurate.

Taiwan Patent Publication No. 201204960 disclosed a method diagnostic of preload ineffectiveness of a ball screw and a device based on the method, in which a voiceprint signal generated while the ball screw is working can be filtered by empirical mode decomposition (EMD), then processed by Hilbert-Huang transform (HHT) to generate Hilbert-Huang spectrum (HHS), next processed by multi-scale entropy extraction to generate multi-scale entropy complexity mode, and after the raw multi-scale entropy complexity mode and the current multi-scale entropy complexity mode are compared, whether the preload of the ball screw disappears or not can be effectively diagnosed. However, in the process of measurement based on such patent, the measuring accuracy is subject to the vibration, noise, or frequency generated during the processing. Therefore, such prior art still fails to provide accurate measuring outcome.

SUMMARY OF THE INVENTION

The primary objective of the present invention is to provide a ball screw capable of real-time surveillance and control of preload, which can enhance the accuracy of preload measurement and less externally interfered for the user's real-time surveillance and control of preload.

The foregoing objective of the present invention is attained by the ball screw composed of a screw rod, two screw nuts, a link, a force sensor, and a plurality of balls. The screw rod includes an external thread. Each of the two screw nuts includes an internal thread and a circulatory passage having an entrance and an exit at two ends thereof. The two screw nuts are sleeved onto the screw rod. A spiral path is formed between the internal threads of the two screw nuts and the external thread of the screw rod and communicates with the circulatory passage. Each of the two screw nuts includes a keyway located on respective toric surfaces of opposite ends of the two screw nuts and facing the other. The link is mounted inside the two keyways to traverse the two screw nuts. The force sensor is mounted between opposite sides of the two screw nuts and squeezed by the two opposite sides of the two screw nuts. The balls are located inside the spiral path or the circulatory passage and keep rolling while moving.

Preferably, the force sensor is annular.

Preferably, the force sensor includes an external contour corresponding to that of a toric surface of each screw nut.

Preferably, the diameter of the external contour of the force sensor is smaller than that of the contour of the external annular end surface of each screw nut.

DETAILED DESCRIPTION OF PREFERRED EMBODIMENTS

Figure 1:
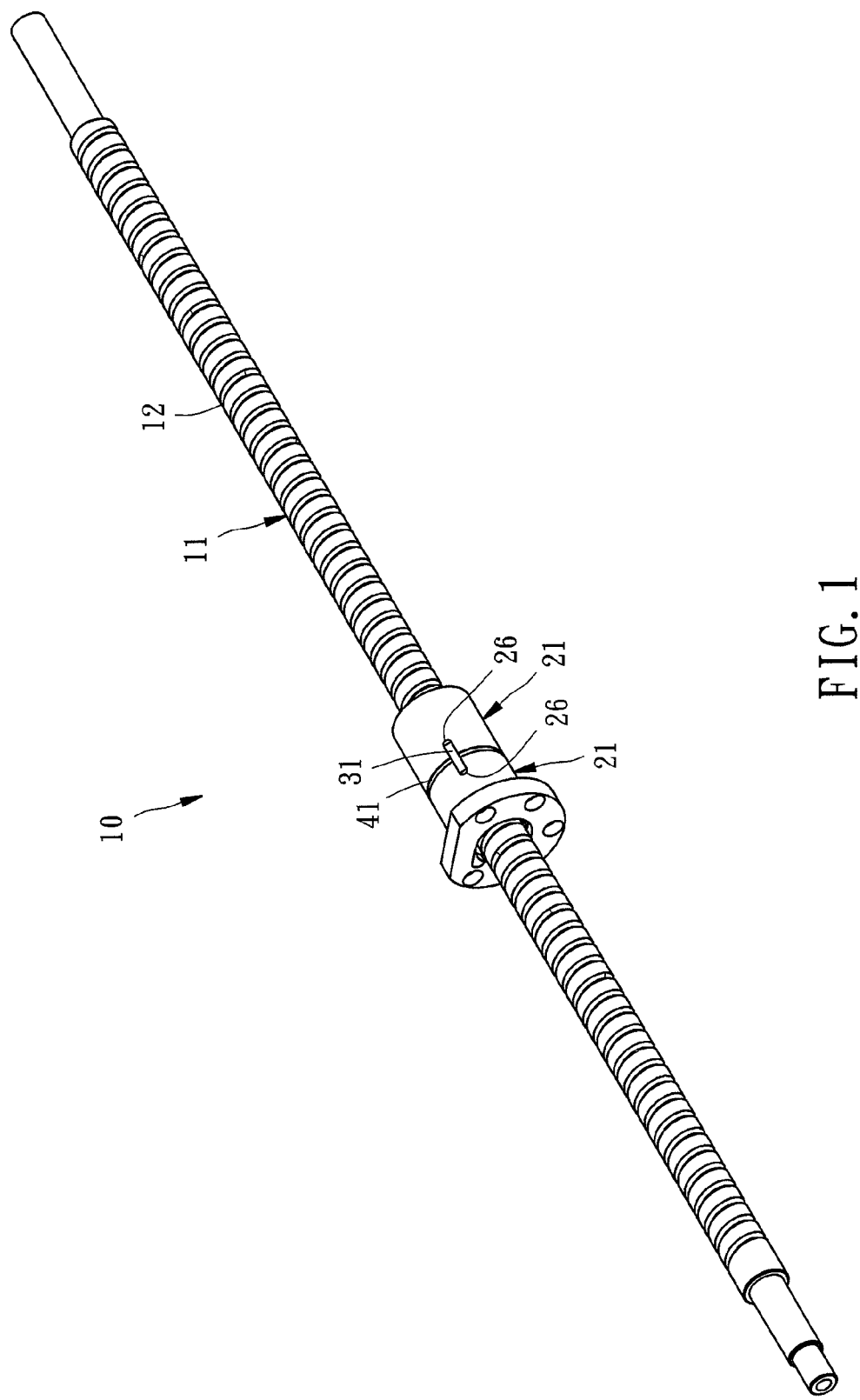
FIG. 1 is a perspective view of a preferred embodiment of the present invention.
Figure 2:
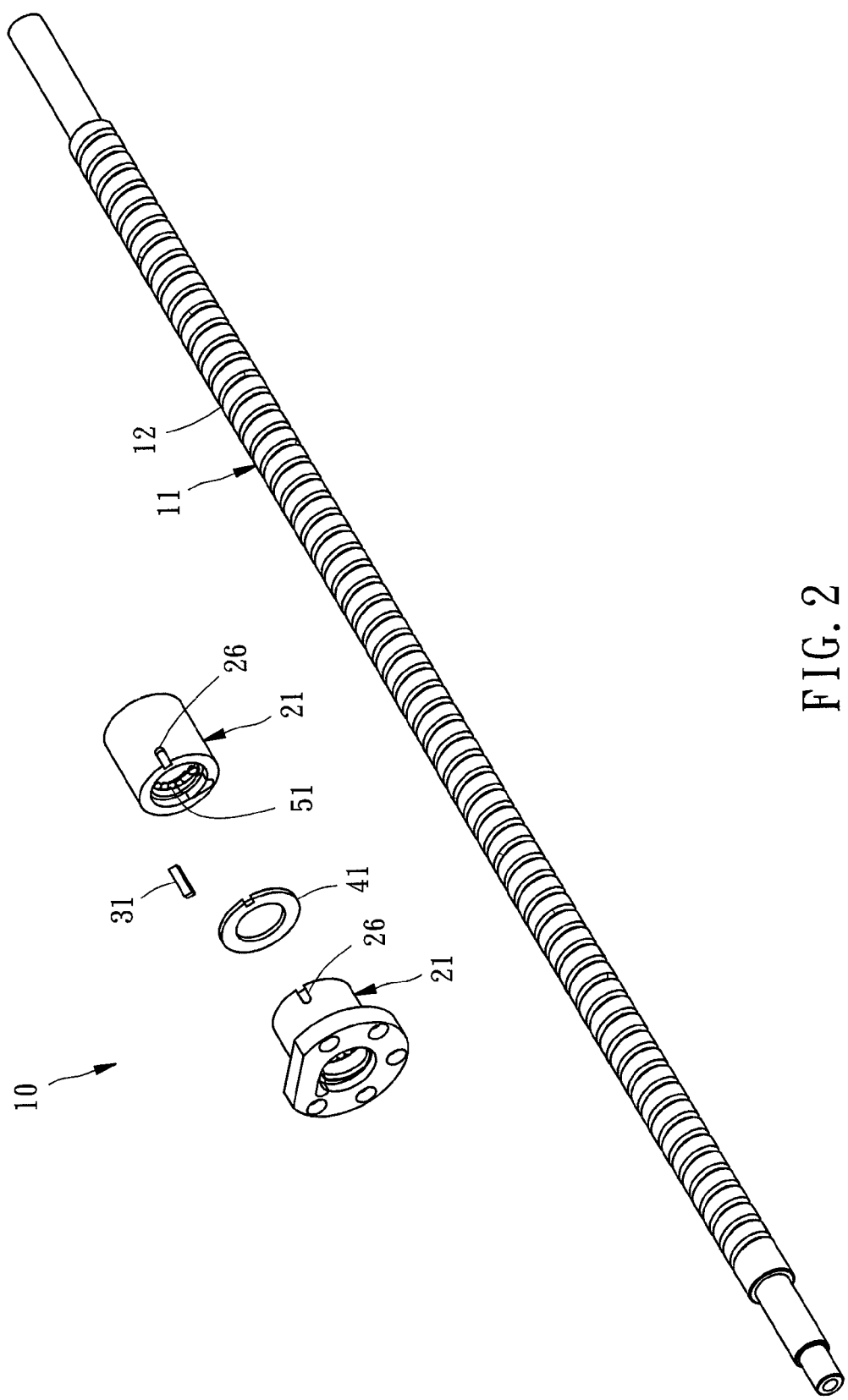
FIG. 2 is an exploded view of the preferred embodiment of the present invention.
Figure 3:
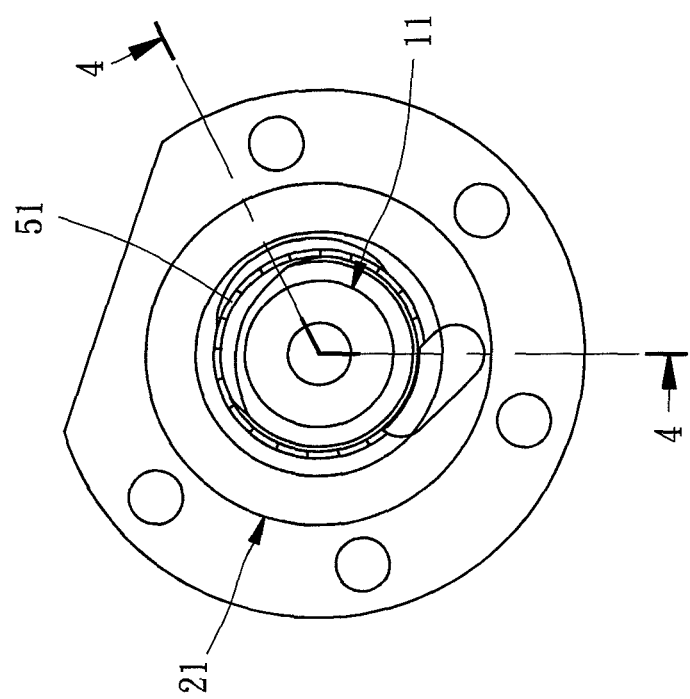
FIG. 3 is a side view of the preferred embodiment of the present invention.

Structural features and desired effects of the present invention will become more fully understood by reference to a preferred embodiment given hereunder. However, it is to be understood that the embodiment is given by way of illustration only, thus being not limitative of the claim scope of the present invention.

Referring to FIGS. 1-4, a ball screw 10 capable of real-time surveillance and control of preload in accordance with a preferred embodiment of the present invention is formed of a screw rod 11, two screw nuts 21, a link 31, a force sensor 41, a plurality of balls 51. The detailed descriptions and operations of these elements as well as their interrelations are recited in the respective paragraphs as follows.

The screw rod 11 includes an external thread 12.

Each of the screw nuts 21 includes an internal thread 22 and a circulatory passage 24. The circulatory passage 24 is provided with an entrance and an exit for the balls to roll inside and outside. Since the entrance and exit of the circulatory passage 24 belong to the prior art, they are not shown in any of the drawings. The two screw nuts 21 are sleeved onto the screw rod 11. A spiral path 19 is formed between the internal threads of 22 of the two screw nuts 21 and the external thread 12 of the screw rod 11 and communicates with the circulatory passage 24. Each of the two screw nuts includes a keyway 26 located on one of opposite ends of toric surfaces of the two screw nuts 21 and the two keyways faces each other.

The link 31 is mounted inside the keyways 26 of the two screw nuts 21 to transverse the two screw nuts 21.

The force sensor 41 is mounted between opposite sides of the two screw nuts 21 and squeezed by the opposite sides of the two screw nuts 21.

The balls 51 are located inside the spiral path 19 or the circulatory passage 24 and keep rolling while moving.

The force sensor 41 can be in either shape in implementation and is annular in this embodiment, having an external contour corresponding to that of a toric surface of each screw nut 21. The external contour of the force sensor 41 is circular in the drawings. Besides, the diameter of the external contour of the force sensor 41 is smaller than that of the toric surface the screw nut 21.

The shape of the force sensor 41 is an example only and not to limit the scope of claim of the present invention. The force sensor can be non-circular or its external contour does not correspond to that of the toric surface of the screw nut 21 or the diameter of the external contour of the force sensor is not smaller than that of the external contour of the screw 21, which is the interchangeability falling within the scope of claim of the present invention.

Figure 4:
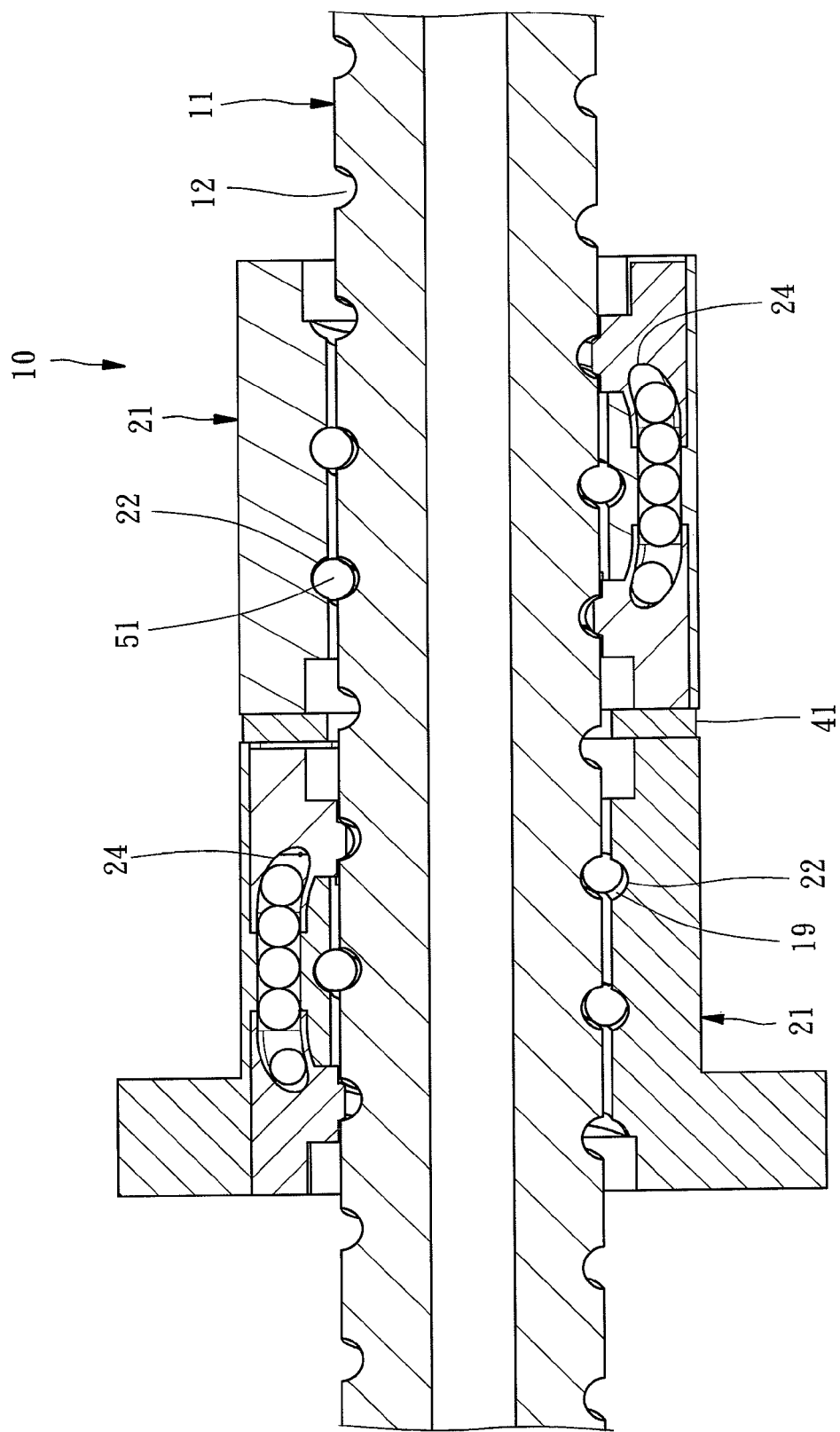
FIG. 4 is a sectional view taken along a line 4-4 indicated in FIG. 3.

Referring to FIG. 4, in the process of operation, the two screw nuts 21 can reciprocate on the screw rod 11 subject to rotation of the screw rod 11. In the process of movement, the spatial relationship between the two screw nuts 21 can be externally forced for change, i.e. the preload between the two screw nuts 21 will be changed in the process of movement, so the force sensor 41 will deform subject to the change of the preload to output corresponding voltage value according to the amount of the deformation. The outputted voltage value can be converted to identify whether the current preload is normal or not.

In conclusion, the preload between the two screw nuts 21 can be monitored and controlled in real time via the voltage value outputted from the force sensor 41 to reach the purpose of the present invention. Besides, the force sensor 41 is mounted between the two screw nuts 21 to be specially located, so the accuracy of preload measurement can be enhanced and less externally interfered.

What is claimed is:

1. A ball screw capable of surveillance and control of preload, comprising:
   a screw rod having an external thread;
   two screw nuts, each of which has an internal thread and a circulatory passage, the circulatory passage having an entrance and an exit at two ends thereof, the two screw nuts being sleeved onto the screw rod, a spiral path being formed between the internal threads and the external thread and communicating with the circulatory passage, each of the two screw nuts having a keyway located on a toric surface of an opposite end of each screw nut, the two keyways facing each other;
   a link mounted inside the keyways and traversing the two screw nuts, wherein the link extends across the opposing ends of the two screw nuts;
   a force sensor mounted between opposite sides of the two screw nuts and squeezed by the opposite sides of the two screw nuts; and
   a plurality of balls located inside the spiral path or the circulatory passage and keeping rolling while moving.

2. The ball screw as defined in claim 1, wherein the force sensor is annular.

3. The ball screw as defined in claim 1, wherein the force sensor comprises an external contour corresponds to that of a toric surface of each screw nut.

4. The ball screw as defined in claim 1, wherein the diameter of the external contour of the force sensor is smaller than that of the toric surface of each screw nut.

* * * * *